J. S. DOYLE.
ELECTROPNEUMATIC BRAKE SYSTEM.
APPLICATION FILED MAR. 17, 1910.
1,090,841.
Patented Mar. 24, 1914.
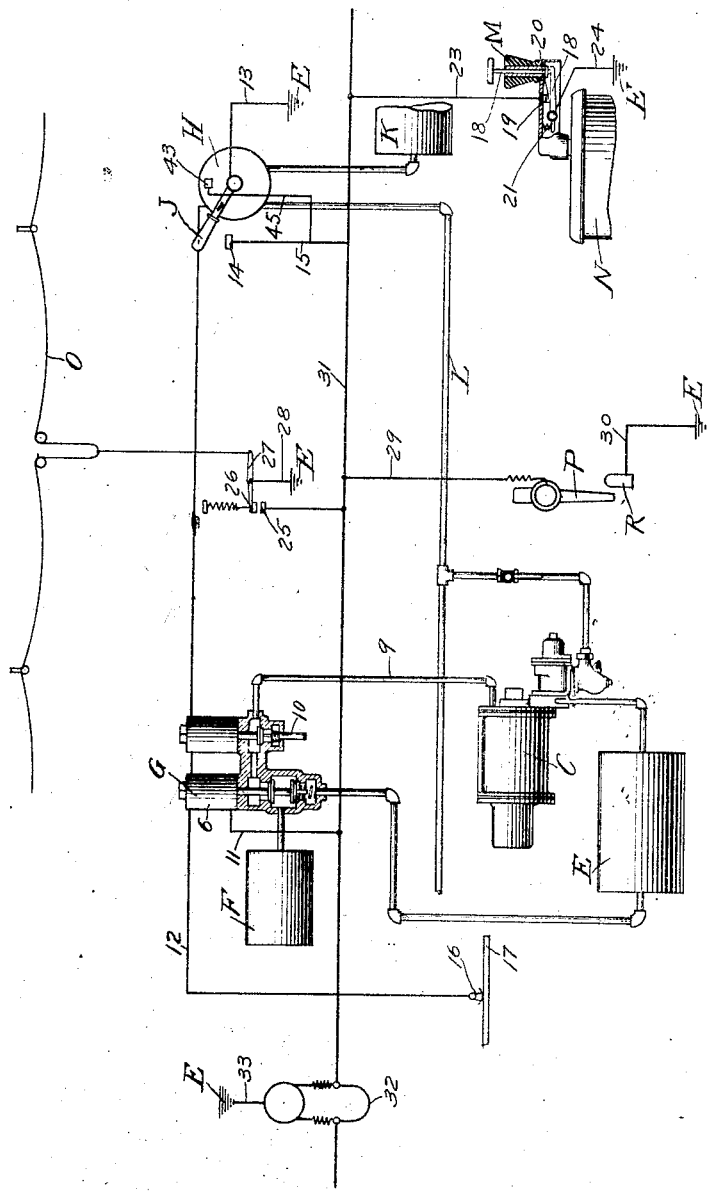
WITNESSES
INVENTOR
James S. Doyle
by Wm. M. Cady
Att'y.

UNITED STATES PATENT OFFICE.

JAMES S. DOYLE, OF NEW YORK, N. Y., ASSIGNOR TO THE WESTINGHOUSE AIR BRAKE COMPANY, OF PITTSBURGH, PENNSYLVANIA, A CORPORATION OF PENNSYLVANIA.

ELECTROPNEUMATIC BRAKE SYSTEM.

1,090,841.  Specification of Letters Patent.  Patented Mar. 24, 1914.

Application filed March 17, 1910.  Serial No. 549,978.

*To all whom it may concern:*

Be it known that I, JAMES S. DOYLE, a citizen of the United States, residing in the city, county, and State of New York, have made a certain new and useful Invention in Electropneumatic Brake Systems, of which the following is a specification.

This invention relates to air brake systems and particularly to means for securing an increased application of air brake pressure in applying the brakes.

The object of the invention is to provide means which are simple and efficient for controlling the application of increased pressure to the air brake mechanisms of surface, subway, elevated and other street or passenger cars or trains.

A further object of the invention is to provide means for reducing the time required to stop trains thereby reducing the distance between adjacent trains or cars in the operation of street or railway systems, and consequently reducing the headway of such cars.

A further object of the invention is to provide means which are simple and efficient for increasing the number and speed of cars or trains in a street car or railway system, to permit of the handling of congested passenger car traffic.

A further object of the invention is to provide means for securing simultaneous and synchronous action of the brakes, in the emergency or other application thereof, on all the cars of a train.

A further object of the invention is to provide means, whereby the electric control of the pneumatic brake mechanism may be cut out of service, if required, throughout the train in case of short circuiting of the circuit thereof at any point.

Other objects of the invention will appear more fully hereinafter.

The invention consists substantially in the construction, combination, location and relative arrangement of parts, all as will be more fully hereinafter set forth, as shown in the accompanying drawing and finally pointed out in the appended claims.

The single figure of the drawing is a diagrammatic view of a car air brake equipment embodying my improvements.

A serious problem in the handling of metropolitan street car traffic and in the attainment of rapid transit, is the difficulty of operating cars or trains with a minimum headway space between the cars or the trains without incurring danger of collisions. Increased demands for rapid transit facilities, equipment and operation of surface, subway and elevated street car systems, and the rapid handling of congested passenger traffic require that trains or cars be operated in as close order as possible, while at the same time a safety limit of spacing apart of cars or trains must be observed in order to avoid danger of loss of life, or property by reason of accidents resulting from collisions. Most systems at present in operation are equipped with signal devices arranged in block order and which are designed to give warning to the motorman of one car or train of his near approach to the next car or train ahead, and in some instances safety devices are provided by means of which the brake mechanism of the car or train is operated automatically to stop the car or train in case through negligence, inattention or other cause, the train should overrun a signal block, or in case the signal system should fail to properly operate. While this arrangement aids in securing a reduction in the headway between cars or trains considerable time is lost in resetting the automatic valve tripping mechanism which controls the operation of the brake devices. Again, where the emergency or other applications of the brakes are controlled electrically, such control is dependent upon the integrity of the wiring system, or, in other words, upon the proper maintenance of the circuit connections, and insulation failures, as in other electric circuits, are very liable to occur, particularly in the rough usage encountered in street or other railway operations. Insulation failures are of course apt to cause the operation of the brake mechanism where such operation is dependent upon the completion of a circuit through electrically operated valves which control the supply of pressure medium to the brake mechanism, and where such a system is employed on trains of eight or ten cars, more or less, the grounding of the control circuit at any point in the system, through insulation failure or other cause results in a setting of the brakes. Where a street or other railway car system is being operated under intense conditions of high speed and close headway between trains, time is consumed in searching for the locality of the ground, the brakes remaining set and the train being stalled until this ground is discovered, thereby throwing out the time schedule of the entire system and causing annoying delays to traffic. Moreover, in the operation, under present methods, of the brake mechanisms of trains, the brakes are applied serially throughout the train, this function beginning usually on the forward car, or at the front end of the train, and continuing successively through the subsequent cars of the train, throughout the length of the train. This operation is extremely dangerous, and particularly where trains are operated at high speeds, for the reason that the application of the brakes on the front car of the train causes the forward end of the train to be arrested with a quick stop before the brakes on the rear cars or at the rear end of the train can be applied, thereby causing the rear portion of the train to collide with the forward portion and causing injury to the cars or to the passengers.

The controlling factor in securing a reduction of the headway between cars or trains, or in spacing apart the automatic brake tripping devices or signals, having due regard to safety of operation, is the distance within which trains or cars can be stopped while operating at a maximum speed. Under normal conditions at present obtaining in the operation of subway trains, for instance, this distance is fourteen hundred feet. By suitably reducing this distance within which trains or cars can be stopped, that is by reducing the time element in effecting the stoppage of trains, it is evident that the distance apart at which the cars or trains may be operated within safety limits can be correspondingly reduced, and hence increasing the number of trains or cars which can be operated over the system, thereby providing increased facilities for handling the volume of traffic.

In order to enable insulation difficulties to be overcome, that is, to permit the release of brakes which may have been applied or set through failure of insulation or other cause, without the necessity of the delay incident to searching for a "ground" the important feature is to so control the circuit of the brake control devices, as to readily cut out the electric control, thereby releasing the brakes and enabling the car or train to proceed on its way under conditions of ordinary control, whereby the car or train may proceed to the car barns or repair shop for the purpose of having the faulty insulation or "ground" corrected without tying up or delaying the operation of other trains on the system. And in order to prevent the dangers due to a serial application of the brakes throughout the train of cars, the important and essential feature is to effect a simultaneous and synchronous application of all the brake devices on all the cars throughout the train.

It is among the special purposes of my present invention to provide means whereby the time element involved in train or car stoppage is reduced, thereby reducing the headway space between cars or trains, and in carrying out my invention I provide means for increasing the supply of pressure medium to the brake mechanism in effecting the stoppage of the car or train. I also provide means for accomplishing this result automatically and electrically through the operation of a valve which controls the additional supply of pressure medium to the brake mechanism. I also provide various arrangements of appliances for operating the valve, or for controlling the operation thereof, in order to insure safety in the operation of the system. I also propose, in accordance with the principles of my invention to employ a train line circuit extending throughout the train for supplying current to all the valve operating devices on all the cars, and to control the supply of current to this circuit by the motorman through controller switches located on each car of the train, but all cut in on the operating car only. In this manner the entire electric control system may be cut out, and the brakes released throughout the train by the motorman merely cutting out the train line circuit. I also propose to avoid accident and damage due to the serial application of the brakes throughout the train by securing simultaneous and synchronous application of all the brakes throughout the train.

According to the drawing, the car air brake apparatus may comprise the storage tank or reservoir E' from which the brake operating medium is supplied to the brake cylinder, and a supplemental pressure reservoir F the pressure from which may be employed to augment that supplied to the brake cylinder when it is desired to reduce the time required to stop the car or train. An electrically operated valve designated generally by reference sign G, Fig. 1, is arranged to control the supply of auxiliary pressure to the brake cylinder to shorten the time of stoppage of the car or train. This may be accomplished by arranging the valve G, to control the connection between the reservoirs F and E', as shown in the drawing.

In the arrangement shown the ordinary supply of pressure medium from the supply reservoir to the brake cylinder is controlled by the engineer's or motorman's control valve the casing of which is indicated generally at H, while the valve operating lever or handle is indicated by reference sign J.

It is obvious that the brake mechanism and its ordinary controlling devices may be of any usual or well known construction, type or arrangement, and while, therefore, I have shown illustrative embodiments of suitable arrangements for carrying out the objects and purposes of my invention, I do not desire to be limited or restricted, in the broadest scope of my invention as defined in the claims, to the particular or any specific type, construction or arrangement thereof.

In accordance with my invention I propose to control in various ways and from various points the circuit connections of the electrically operated valve G. Thus, in one arrangement, I include the engineer's or motorman's brake control valve handle or lever J, in an electric circuit 13, grounded at E, and which circuit is completed through said lever J, and a contact 14, against which said lever bears when in a certain position, thence through connections 15, 31, and 11, the coils of the solenoid 6 of the electrically operated valve device G, and connection 12 to a suitable source of current. As illustrative of a suitable arrangement which answers the purpose, but to which, of course, my invention is not to be limited or restricted, I have shown the connection 12 as leading to a contact shoe 16, operating against a third rail or conductor 17. With this arrangement it will be seen that whenever lever J, is moved into position to make contact with the contact 14, a circuit through the valve operating device G, is completed thereby actuating the valve and hence admitting augmented or auxiliary pressure to the brake mechanism thereby increasing the braking action and effecting a stoppage of the train or car in a shorter space of time than would be required if the ordinary braking pressure controlled by the valve lever J through train pipe L, in the usual manner, were depended on.

Another arrangement is shown for completing the circuit of the electric valve device G, through the control handle M of the controller N. Associated with handle M is a lever 18, which is moved or shifted when the control handle M is grasped by the engineer or motorman, so as to separate the contacts 19, 20. When, however, the handle M is released the lever 18 is moved by a spring 21, or otherwise to close contacts 19, 20, upon each other thereby completing the electric circuit from the source of current through connection 12, coil 6, wire 11, wire 31, wire 23, contacts 19, 20, lever 18, and wire 24, to ground at E, and hence operating the valve to supply the additional or auxiliary pressure to the brake cylinder.

Another arrangement is shown wherein the completion of the circuit of the valve device G, may be controlled by the conductor's cord O, thus affording means for effecting a quick stoppage of the car or train from any point in the length of the car or train. In this case the pulling of the cord O, causes contacts 25, 26, to close upon each other, thereby completing the circuit from the current source through wire 12, valve device G, wire 11, wire 31, contacts 25, 26, lever 27, and wire 28 to ground at E.

Another arrangement is shown wherein a trip arm P, carried by the car makes contact with stops R, placed at suitable points along the line of the road, thereby completing circuit from the current source through circuit wire 12, valve device G, circuit wire 11, wire wire 29, car trip P, track trip R, and wire 30 to ground E. The completion of the circuit through the valve device G, may also be effected in case two cars of a train should pull apart, by means of a circuit wire 31, extending from car to car throughout the train, and having the usual coupling between the cars as indicated at 32, constructed to make a ground connection in case the coupling 32 should part, thereby completing circuit from the current source through circuit wire 12, valve device G, circuit wire 11, wire 31, and wire 33 to ground E.

It is obvious that the ground connection may be effected in any one or all of the instances above noted, or other suitable arrangements for accomplishing the same purposes, through the truck frame, axles, or wheels of the car or otherwise as may be convenient. It will also be seen that I secure a simultaneous and synchronous operation and application of all the brake mechanisms on all the cars throughout the train, whenever the valve control circuit is completed to ground at any point.

It may sometimes happen that the motorman may, through carelessness, neglect or other cause, throw his control lever J, too far or not far enough to cause an emergency application of the brake mechanism, or may, in an exigency, throw his lever J, in the wrong direction, and before his mistake or error is discovered, a collision may occur. In order to prevent this, in addition to the contact 14, in the line circuit 15, with which coöperates the lever J, I also employ another contact 43, connected through conductor 45, with the line circuit 15, thus providing an additional means through which the emergency application of the brakes may be effected in a different position of the control lever J.

The various arrangements for controlling the circuit connections of the valve operating means, being simple in their nature, and each supplying an additional element of safety in the operation of the system, may all be employed, or one or more of them may be associated together, without departure from the spirit and scope of my invention as defined in the claims, the essential feature being that provision is made for decreasing the time required for stopping a car or train by supplying additional or extra pressure to the brake mechanism, that is by increasing the braking effort of the brake mechanism, and hence I am enabled to operate a greater number of cars or trains over the system and to maintain a shorter headway space between adjacent cars or trains without danger of accident or injury through collision.

Having now set forth the object and nature of my invention, and arrangements embodying the principles thereof, what I claim as new and useful and of my own invention, and desire to secure by Letters Patent is,—

1. The combination with car brake mechanism, and means for controlling the supply of pressure medium thereto, of means for supplying additional pressure to the brake mechanism, electrically operated devices for controlling the same, and a power controller, a brake valve, and means controlled by the power controller and the brake valve for controlling the circuit of the electrical devices.

2. The combination with car brake mechanism, of a pressure supply reservoir, a valve for controlling the supply of pressure medium from the reservoir to the brake mechanism, electrical devices for operating said valve, a power controller, a brake valve, and means controlled by said power controller and brake valve for controlling the circuit of said electrical devices.

3. The combination with an electrically controlled car brake operative to effect an application of the brakes upon grounding the electric circuit thereof, of a brake valve, an electric car controller and a conductor's cord, each adapted to ground the circuit of said electrically controlled car brake.

In testimony whereof I have hereunto set my hand in the presence of the subscribing witnesses, on this 4th day of March, A. D. 1910.

JAMES S. DOYLE.

Witnesses:
C. C. HEURICHE,
S. E. DARBY.